(12) United States Patent
Dovalis et al.

(10) Patent No.: US 9,195,064 B1
(45) Date of Patent: Nov. 24, 2015

(54) VERSATILE GLARE REDUCER

(71) Applicant: David G. Dovalis, Appleton, WI (US)

(72) Inventors: James G. Dovalis, Appleton, WI (US); Mark S. Payne, Neenah, WI (US)

(73) Assignee: James G. Dovalis, Appleton, WI (US)

( * ) Notice: Subject to any disclaimer, the term of this patent is extended or adjusted under 35 U.S.C. 154(b) by 438 days.

(21) Appl. No.: 13/793,944

(22) Filed: Mar. 11, 2013

Related U.S. Application Data

(60) Provisional application No. 61/608,680, filed on Mar. 9, 2012.

(51) Int. Cl.
*B60J 3/00* (2006.01)
*G02B 27/00* (2006.01)

(52) U.S. Cl.
CPC ...................................... *G02B 27/00* (2013.01)

(58) Field of Classification Search
CPC ....................................................... G02B 27/00
See application file for complete search history.

(56) References Cited

U.S. PATENT DOCUMENTS

| | | | | |
|---|---|---|---|---|
| 3,988,033 A | * | 10/1976 | Vacha | 296/97.6 |
| 4,003,597 A | * | 1/1977 | Acuff | 296/97.6 |
| 2004/0217621 A1 | * | 11/2004 | McCoy | 296/97.6 |
| 2011/0156435 A1 | * | 6/2011 | Carter | 296/97.6 |

* cited by examiner

*Primary Examiner* — Lori L Lyjak
(74) *Attorney, Agent, or Firm* — Craig A. Fieschko, Esq.; DeWitt Ross & Stevens S.C.

(57) ABSTRACT

A device for shielding a user from undesired light includes a flexible arm that can be adjusted to hold different configurations. The device includes at least one fixing assembly with a suction cup for securing the device to a smooth surface. The device also includes at least one shield assembly with a shield member for shielding light. The fixing and shield assemblies are securable to an end of the flexible arm or along the length of the flexible arm. A receptacle interfaces with the fixing assembly and allows the device to be secured to (for example) a sun visor. A user may secure the device to the windshield or dashboard of a vehicle using a fixing assembly. The flexible arm with one or more shielding assemblies may be adjusted/shaped to position shield members, and readjusted/reshaped as undesired light shifts position relative to the user.

20 Claims, 8 Drawing Sheets

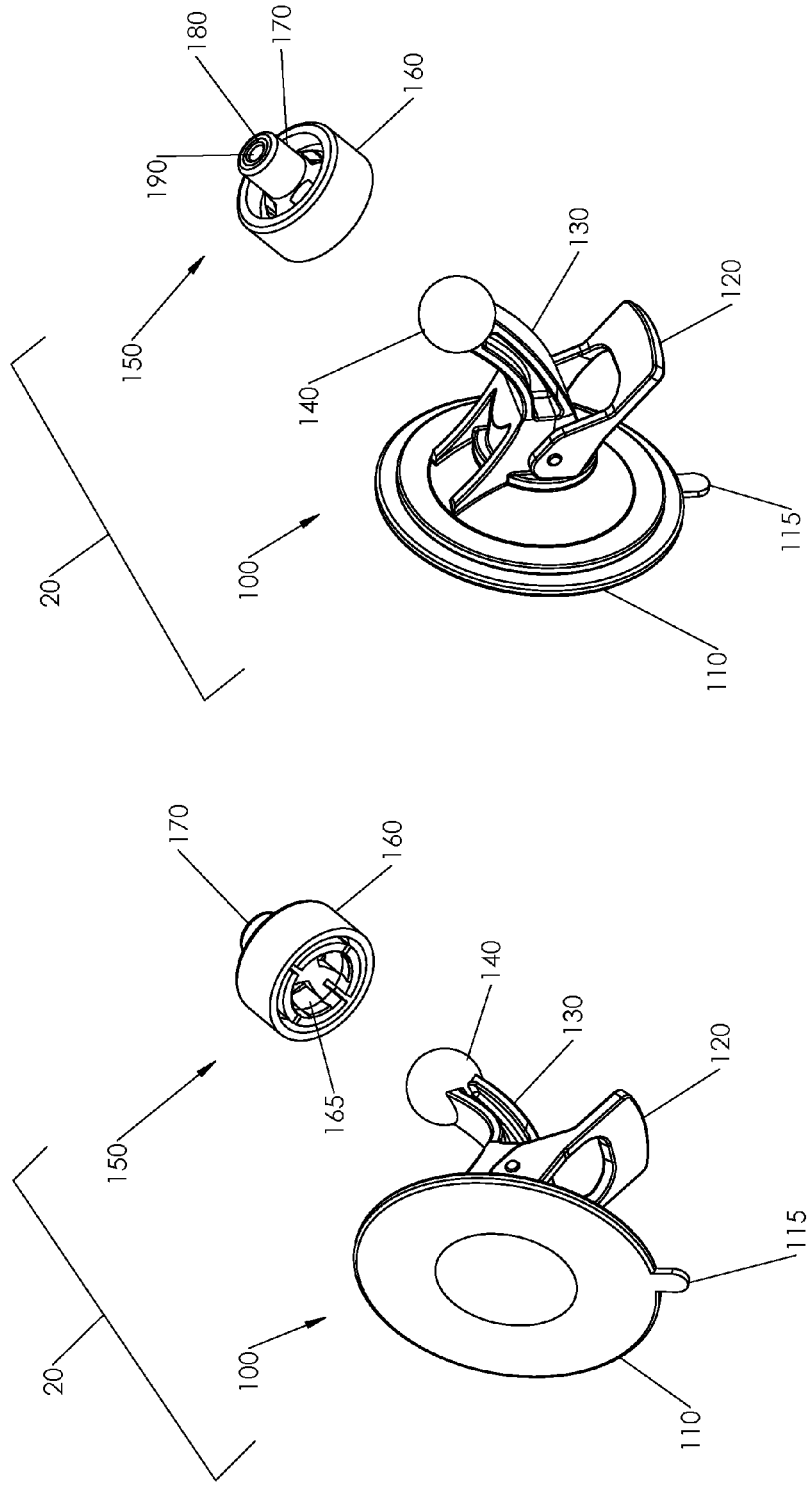

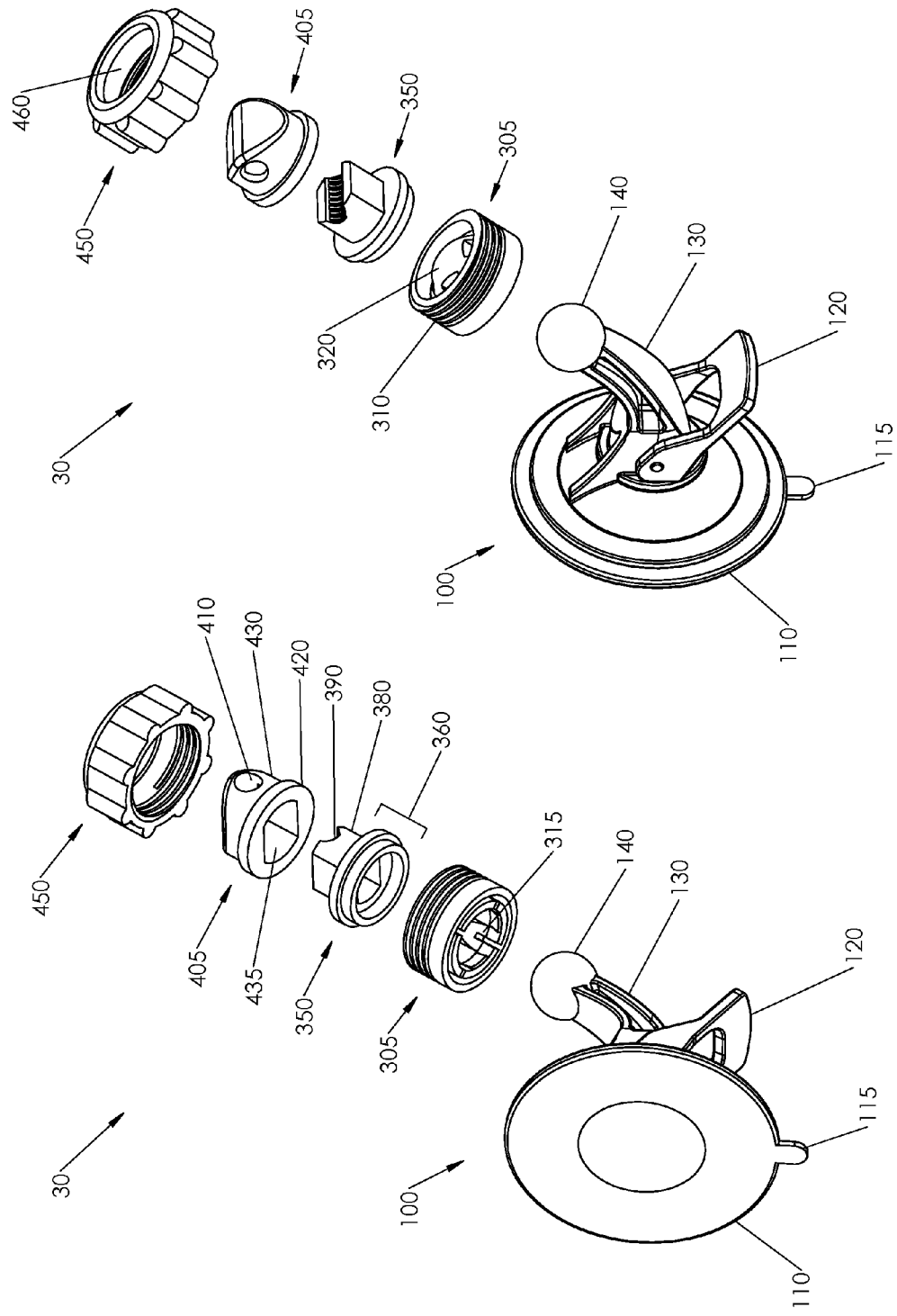

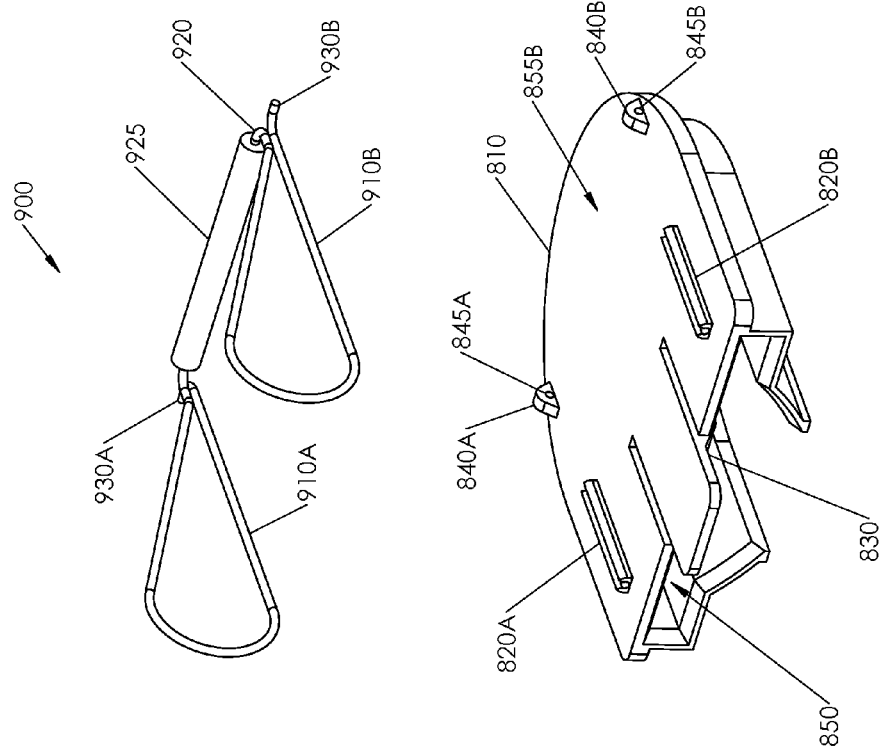
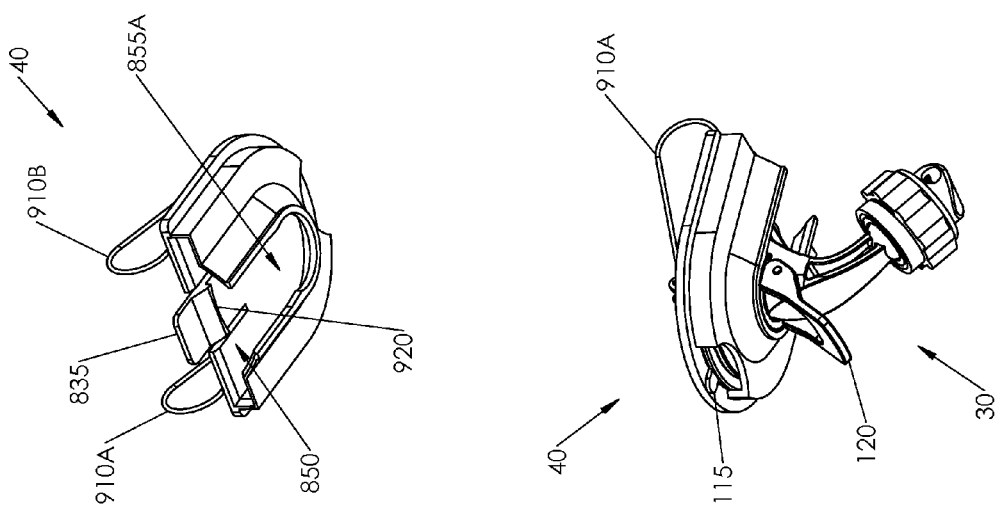
FIGURE 5B
FIGURE 5A

VERSATILE GLARE REDUCER

CROSS-REFERENCE TO RELATED APPLICATIONS

This application claims priority under 35 USC §119(e) to U.S. Provisional Patent Application 61/608,680 filed Mar. 9, 2012, the entirety of which is incorporated by reference herein.

FIELD OF THE INVENTION

This document concerns an invention relating generally to devices for reducing undesired light, and more specifically to a versatile device well-suited for use in vehicles to shield against reflections, glare, or direct illumination from the sun.

BACKGROUND OF THE INVENTION

Glare or other undesired light (whether the light is direct, reflected, or refracted) can be anywhere there is a light source. This can be a nuisance (if not a safety hazard) to, for example, drivers experiencing undesired light originating from the sun, street lamps, headlights, etc., or in a room or office with one or more windows or bright light sources. What is needed is a versatile and adjustable shielding device that can be conveniently secured inside a car or anywhere there is undesired light, and easily adjusted and readjusted as the undesired light shifts relative to the user.

SUMMARY OF THE INVENTION

The invention, which is defined by the claims set forth at the end of this document, is directed to a device for reducing undesired light which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1A, 1B, and 1C, an exemplary device 10 for reducing glare includes a flexible arm 80 that can be adjusted to hold different shapes/configurations. The device 10 includes at least one fixing assembly 20, 30 having a suction cup mount 100 with a suction cup 110 for securing the device 10 to (for example) a glass surface. The fixing assembly may be secured to an end of the flexible arm 80 or along the length of the flexible arm 80. The device 10 includes at least one shielding assembly 50, 60, 70 with a shield member 500, 600, 700 for shielding against undesired light. Shield assemblies may also be secured to an end of the flexible arm 80 or along its length. A receptacle 40 can interface with the fixing assembly 20, 30 and allows the device 10 to be secured to (for example) a sun visor in a vehicle. A user may secure the device 10 to (for example) the windshield or dashboard of a car using one of the fixing assemblies 20, 30. The flexible arm 80 with one or more shielding assemblies 50, 60, 70 secured thereto may then be adjusted to position and reposition the shield members 500, 600, 700 so as to shield against undesired light.

The profile and configuration of the device 10 allow the user to shield sources of light/glare without blocking the user's view. That is, a larger, unobstructed field of view with minimized blind spots can be achieved. When the device 10 is secured to a windshield or dashboard of a vehicle, for example, the driver's view of the road is not unsafely impeded and instead can be enhanced. The flexibility of the arm 80 and its ability to be adjusted and readjusted to hold different shapes allow the shield members 500, 600, 700 to be repositioned as (for example) sources of light shift positions relative to the user. The device 10 can thus be used in virtually limitless different configurations, affording the user a great range of protection and flexibility.

The device 10 facilitates one-handed operation as the user is able to (1) grasp the fixing assembly 20, 30 and secure it to a surface using one hand, (2) reshape the flexible arm 80 using the same hand once the device 10 has been secured to the surface, and (3) aim/re-aim a shield member 500, 600, 700 as desired using the same hand. The receptacle 40 can serve as an optional safety mechanism that can allow the device 10 to be secured to a non-glass surface (such as a visor), as a jolt while driving can potentially dislodge the suction cup 110 (and thus the device 10) from the surface to which it is secured.

Further advantages and features of the invention will be apparent from the remainder of this document in conjunction with the associated drawings.

BRIEF DESCRIPTION OF THE DRAWINGS

FIGS. 2A and 2B show the fixing assembly 20 of FIGS. 1A, 1B, and 1C from two different perspectives.

FIGS. 3A and 3B show the fixing assembly 30 of FIGS. 1A, 1B, and 1C from two different perspectives.

FIG. 5A shows the fixing assembly 30 and receptacle 40 of FIGS. 1A, 1B, and 1C. FIG. 5B shows an exploded view of the receptacle 40 of FIGS. 1A, 1B, 1C and 5A.

DETAILED DESCRIPTION OF PREFERRED VERSIONS OF THE INVENTION

Figure 1A:
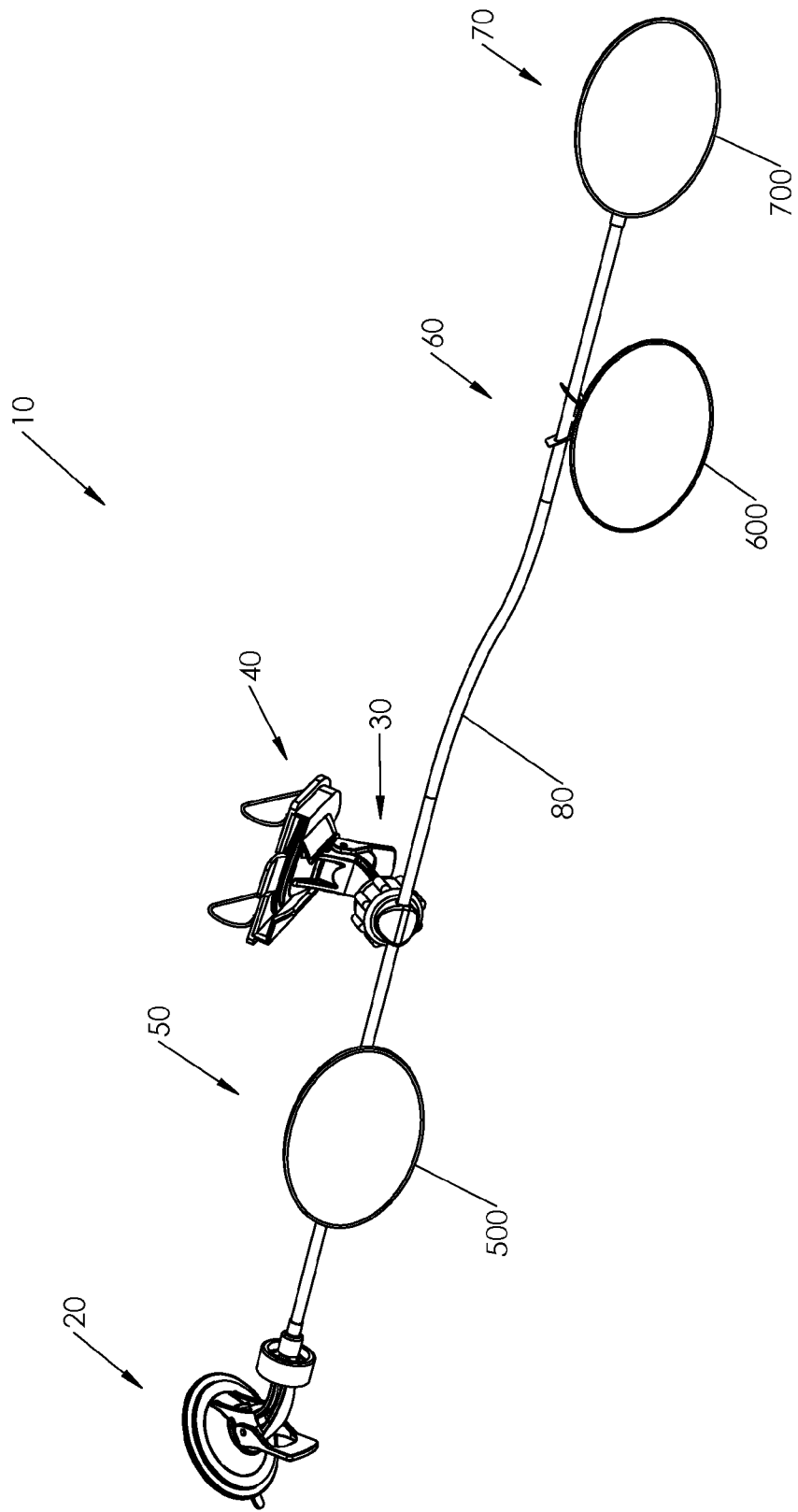
FIG. 1A is a perspective view of an exemplary device 10 for reducing glare, with optional fixing assemblies 20, 30 and optional shield assemblies 50, 60, 70 secured to flexible arm 80 (with shield member forward sides showing).

Returning to FIGS. 1A, 1B and 1C, an exemplary light-reducing/glare-reducing device that illustrates preferred features of the invention is designated generally by the reference numeral 10. The snake-like flexible arm 80 extends from an arm first end 85 to an arm second end 95, and may be turned, twisted, or otherwise reshaped as desired. The device 10 may be secured using a terminal fixing assembly 20 (FIGS. 2A, 2B) secured to the arm first end 85 (FIG. 1C), and/or a non-terminal fixing assembly 30 (FIGS. 3A, 3B) secured along the length of the flexible arm 80 between the arm first and second ends 85, 95. The fixing assemblies 20, 30 include a suction cup mount 100 having a suction cup 110 to allow the device 10 to be secured to (for example) glass in vehicles, at home, at the office, etc., or other smooth surfaces. Secured to the flexible arm 80 are one or more shielding assemblies 50, 60, 70 (FIGS. 4A, 4B), which may be a (non-terminal) socketed shielding assembly 50, a (non-terminal) clipped shielding assembly 60, and/or a (terminal) bossed shielding assembly 70. The receptacle 40 may be secured to the terminal fixing assembly 20 and/or the non-terminal fixing assembly 30 via the suction cup mount 100 to allow the device 10 to be secured to (for example) the sun visor in a vehicle.

Figure 1B:
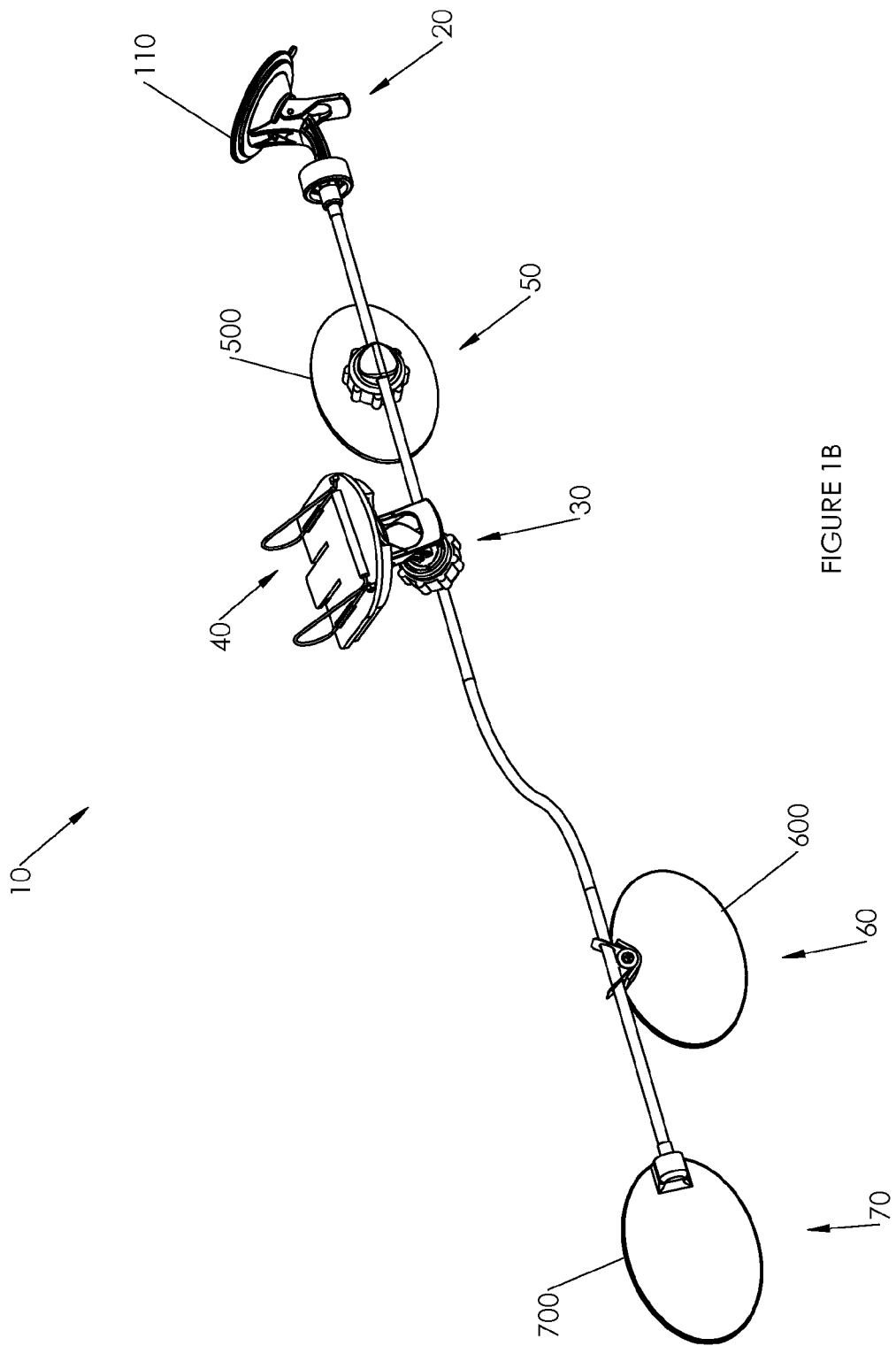
FIG. 1B is the device 10 of FIG. 1A shown from an opposing side (with shield member rear sides showing).
Figure 1C:
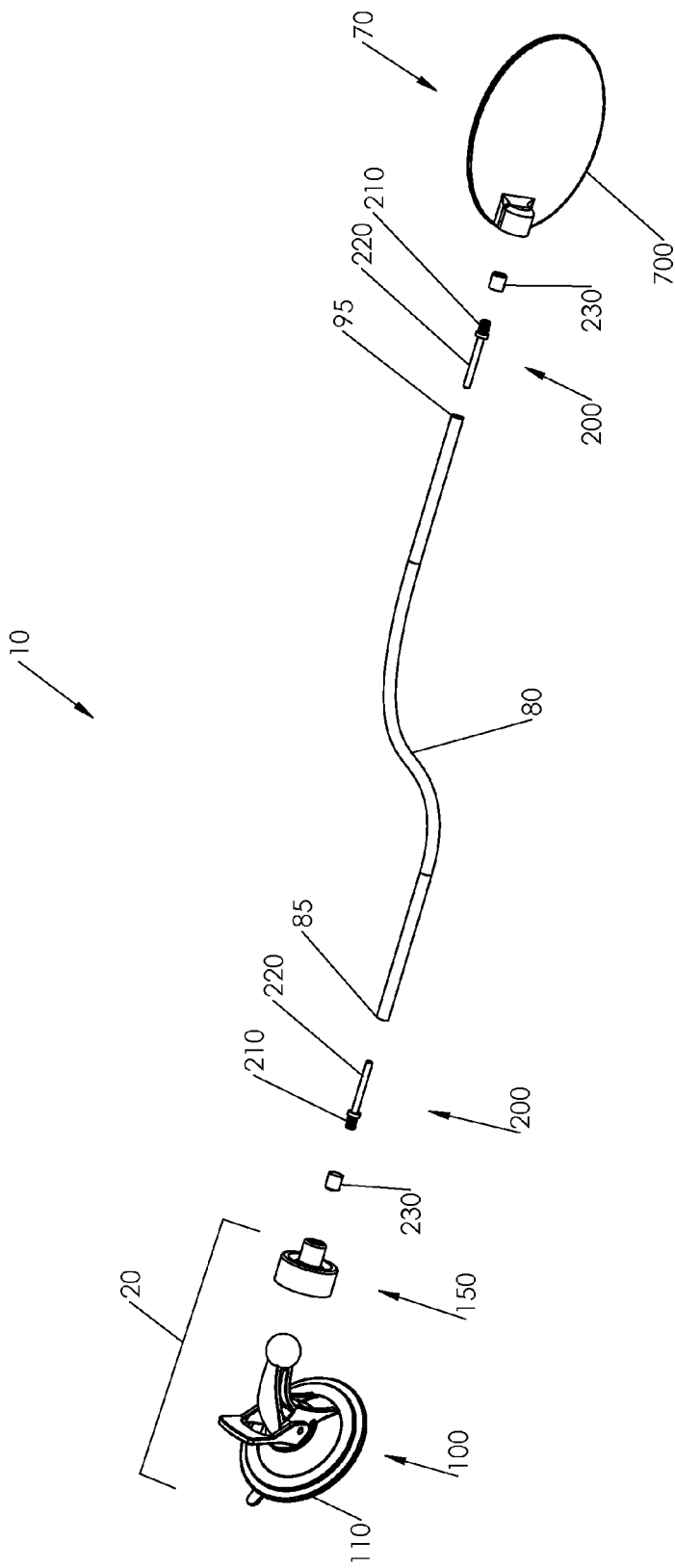
FIG. 1C is an exploded view of the fixing assembly 20 and shielding assembly 70 of FIGS. 1A and 1B showing an exemplary mechanism for securing fixing assembly 20 and shielding assembly 70 to the flexible arm 80.

Referring to FIGS. 1C, 2A, and 2B, the terminal fixing assembly 20 may be secured to the arm first end 85 via a pin 200 having a pin threaded portion 210 and an unthreaded pin shaft 220. The pin 200 can be secured to the flexible arm 80 by inserting the pin shaft 220 into the flexible arm 80. A ferrule 230 may be a stamped/formed cylindrical member (preferably made of a metal or metal alloy) that can be crimped over the end of the flexible arm 80 to help retain the pin 200 with the flexible arm 80. The pin shaft 220 provides support for the crimping action of the ferrule 230, which may also be useful in covering sharp edges that may have been left from the process of cutting the flexible arm 80 to its finished length. A terminal socket 150 includes a terminal socket boss 170 extending from a terminal socket base 160. A socket boss aperture 180 formed in the socket boss 170 may include a threaded metallic insert 190 (or itself may be internally threaded) to receive the pin threaded portion 210 to secure the pin 200 (and thus the flexible arm 80) to the terminal socket 150.

The socket base 160 is securable to the fixing assembly 20 via a fixing assembly interface 140. The suction cup mount 100 shown in the figures is a standard suction cup mount 100 often used to secure electronic devices (such as portable GPS devices) to vehicle windshields. If such a suction cup mount 100 is being used, the fixing assembly interface 140 is a "male" ball socket, and the socket base 160 includes a complementary socket base "female" portion 165 to securely receive the ball socket 140 therein (and secure the terminal socket 150 to the suction cup mount 100). The suction cup 110 and the ball socket 140 of the suction cup mount 100 are separated by a suction cup mount body 130. A suction cup mount lever 120 can be pivoted so as to "flatten" the suction cup 110 (and help achieve the negative pressure that helps secure the suction cup 110 to smooth surfaces), or to release the suction cup 110 from a surface. The suction cup tab 115 allows the user to "peel" the suction cup 110 off of a surface to which the suction cup 110 has adhered.

Referring to FIGS. 1A, 3A and 3B, the non-terminal fixing assembly 30 includes the suction cup mount 100 with the suction cup 110 and the fixing assembly interface 140 (here, the ball socket). An externally threaded non-terminal socket 305 includes a non-terminal socket female portion 315 that is able to securely receive the ball socket 140. A clamp 350 includes a clamp head portion 380 extending from a clamp rim portion 360. The clamp head portion 380 includes a clamp valley/cradle 390 formed therein, the clamp valley/cradle 390 shaped to complementarily receive at least a portion of the flexible arm 80. The valley 390 is preferably grooved to increase friction and help better engage the flexible arm 80 when the flexible arm 80 is received therein. A bushing 405 includes a bushing head portion 430 extending from a bushing rim portion 420. The bushing head portion 430 includes bushing apertures 410 at opposing sides thereof (a "cross hole"), the bushing apertures 410 aligned so as to allow the flexible arm 80 to pass therethrough. The bushing head portion 430 includes a bushing head portion opening 435 sized to receive at least a portion of the clamp head portion 380 therein. A nut 450 sized to fit over the non-terminal socket 305 includes a nut aperture 460 extending therethrough. The nut aperture 460 is internally-threaded and sized to receive at least a portion of the bushing head portion 430 therein.

To assemble the non-terminal fixing assembly 30, the non-terminal socket 305 "snaps" onto the ball socket 140 of the suction cup mount 100 via the non-terminal socket female portion 315. The clamp rim portion 360 is at least partly inserted in a non-terminal socket valley 320, and the clamp head portion 380 is at least partly inserted in the bushing head portion opening 435. The nut 450 fits over the bushing 405 and the clamp 350, threading over the external threads 310 of the non-terminal socket 305. With the nut 450 loosened, the flexible arm 80 is fished through the bushing apertures 410 of the bushing 405 and the clamp valley 390. The flexible arm 80 can slide back and forth along its length and rotated to position the flexible arm 80 as desired. The nut 450 is then tightened to the non-terminal socket 305 to "lock" the flexible arm 80 in place.

Figure 4A:
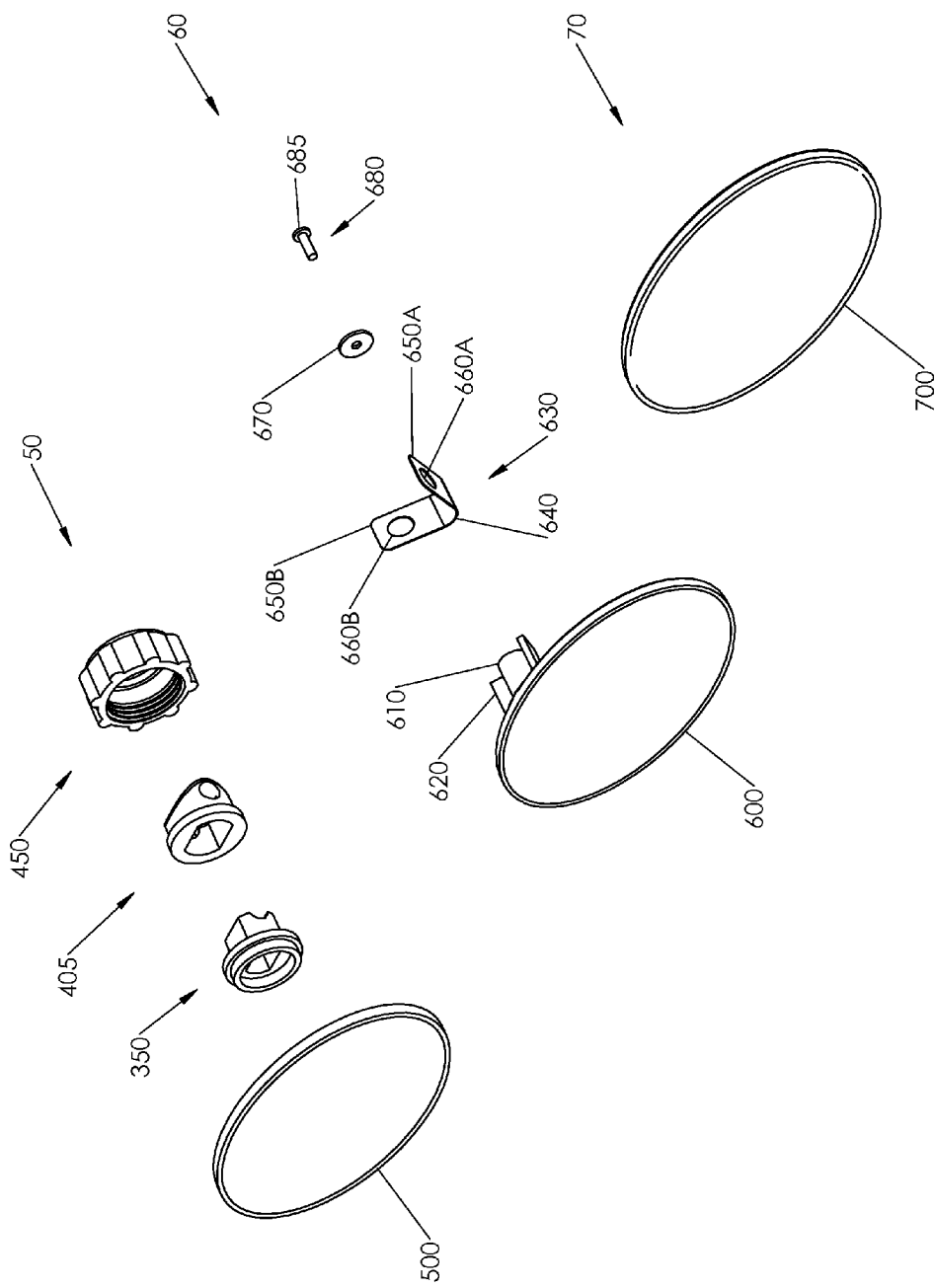
FIGS. 4A and 4B show the shield assemblies 50, 60, and 70 of FIGS. 1A, 1B, and 1C from two different perspectives.
Figure 4B:
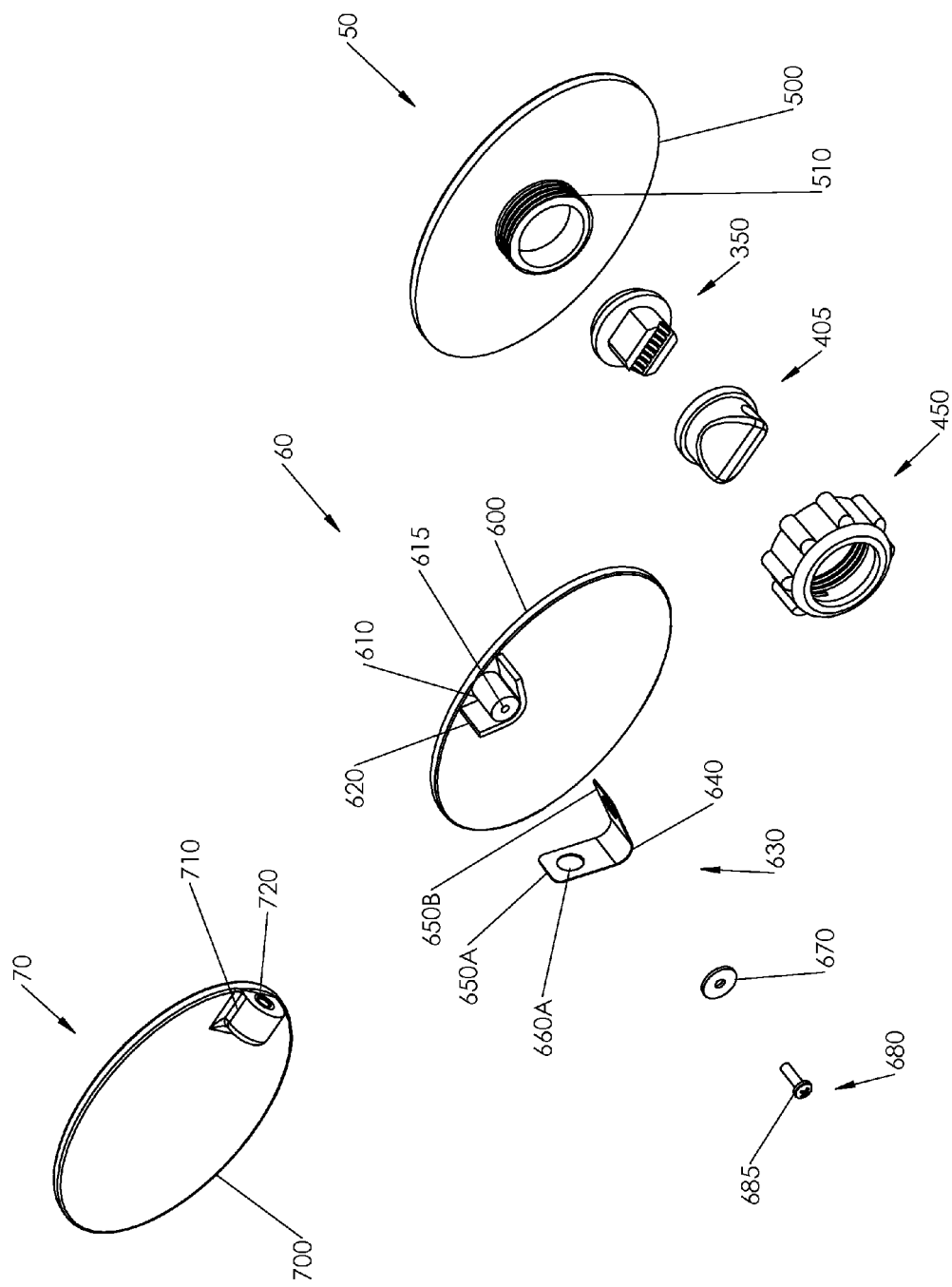

Referring to FIGS. 4A and 4B, a non-terminal shielding assembly 50 includes a socketed shield member 500 having a cylindrical shield base 510 extending therefrom. The shield base 510 is externally-threaded and is functionally analogous to the externally-threaded non-terminal socket 305 discussed above. That is, the socketed shield member is secured to the flexible arm 80 using a clamp 350, a bushing 405, and a nut 450, with the nut 450 engaging the externally-threaded shield base 510 as the nut 450 discussed above engages the externally-threaded non-terminal socket 305.

A clipped shielding assembly 60 includes a clip shield member 600 and a spring clip 630. The spring clip 630 includes a clip first wing 650A and a clip second wing 650B extending from opposing sides of a clip base 640. The clip first and second wings 650A, 650B have clip first and second wing apertures 660A, 660B, respectively. The clip first and second wing apertures 660A, 660B can receive the flexible arm 80 therethrough when the first and second wings 650A, 650B are squeezed together. That is, the clip first and second wings 650A, 650B are flexibly biased such that the clip first and second wings 650A, 650B may be pressed closer together (without deforming the wings) to linearly align the clip first and second wing apertures 660A, 660B. With the clip first and second wing apertures 660A, 660B aligned, the flexible arm 80 is readily able to slide through the apertures 660A, 660B. With the flexible arm 80 through the apertures, the first and second wings 650A, 650B are released, allowing the wings to return to their "resting" or "normal" state. Because the clip first and second wings 650A, 650B are biased, they press against ("grip") the flexible arm 80 when not being pressed together. The flexible arm 80 resists sliding along the spring clip 630 as a result of the pressure and friction between the wings and the flexible arm 80. The position of the clip shielding assembly 60 along the length of the flexible arm 80 may be changed by squeezing the clip first and second wings 650A, 650B, sliding the assembly along the flexible arm 80, and releasing the clip first and second wings 650A, 650B.

Extending from the clip shield member 600 are a shield member boss 610 and a shield member cradle 620. The shield member boss 610 includes a shield member boss aperture 615, and has a length approximately the same as the width of the clip base 640. The shield member boss aperture 615 may include a threaded metallic insert therein or may be internally threaded. To assemble the clip shielding assembly 60, the spring clip 630 is inserted between the shield member boss 610 and the shield member cradle 620. A fastener 680 is inserted into the shield member boss aperture 615. A washer 670 having a radius large enough to extend over the clip base 640 is situated between the shield member boss 610 and a fastener head 685 to secure the spring clip 630 to the clip shield member 600.

Referring to FIGS. 1A, 1B, and 1C as well as FIGS. 4A and 4B, a terminal shielding assembly 70 may be secured to the flexible arm 80 at the arm second end 95. A bossed shield member 700 includes a shield boss 710 extending therefrom, with the shield boss having a shield boss aperture 720 formed therein. The terminal shielding assembly 70 may be secured to the flexible arm 80 via a pin 200 having a pin threaded portion 210 and a pin shaft 220 that is unthreaded, much like the terminal fixing assembly 20 may be secured to the flexible arm 80. A threaded metallic insert may be provided within the shield boss aperture 720 for engaging the pin threaded portion 210. It is noted that if one or both of the ends of the flexible arm 80 do not include either a fixing assembly 20, 30 or a shielding assembly 50, 60, 70, a threaded pin 200 may be replaced by a simple pin (not pictured) that is inserted inside the flexible arm 80, or the pin may be eliminated. A corresponding ferrule (such as a ferrule 230) may be crimped over the end of the flexible arm 80 so that sharp edges at the end of the flexible arm 80 and the pin (if any) are not exposed.

Referring to FIGS. 5A and 5B, the receptacle 40 may be used as an interface between the suction cup mount 100 and a structure such as a sun visor of a vehicle. The receptacle 40 includes a receptacle base 810 having a base inner face 855A and an opposing base outer face 855B. A pair of snap rails 820A, 820B and a pair of anchors 840A, 840B extend from the base outer face 855B, the anchors 840A, 840B having anchor apertures 845A, 845B formed therein. A wire-formed bail 900 extends from a first wire terminus 930A to a second wire terminus 930B, and includes a first bail leg 910A and a second bail leg 910B. The bail 900 is secured to the receptacle 40 by inserting the first and second wire terminuses 930A, 930B in the anchor apertures 845A, 845B, and by inserting ("snapping") the first and second bail legs 910A, 910B into the snap rails 820A, 820B. A bail arm 920 is provided along the wire between the first and second bail terminuses 930A, 930B. The wire of the bail 900 is formed so as to bias the bail arm 920 towards the base outer face 855B. An elastomeric grip 925 may be provided about the bail arm 920 to reduce slipping between the backside of the visor (or other structure) and the bail arm 920.

The receptacle 40 includes a receptacle slot 850 sized to receive the suction cup 110 therein. The base inner face 855A is preferably at least substantially flat and provides enough surface area for the suction cup 110 to be secured thereto. The receptacle 40 base may include a spring finger 830 with a finger ramp 920 extending therefrom. A finger tab 835 may extend from the finger ramp 920. When the suction cup 110 is received within the receptacle slot 850, the ramp 920 impedes the suction cup 110 from exiting the receptacle slot 850. To separate the suction cup mount 100 from the receptacle 40, the lever 120 may be pivoted to release the suction cup 110, and the suction cup tab 115 may be used to disengage the suction cup 110 from the base inner face (if the suction cup 110 is secured thereon). Pressure may then be applied to the finger tab 835 to retract the ramp 920 so that the ramp 920 no longer impedes the suction cup 110 from exiting the receptacle slot 850.

The shield members 500, 600, 700 discussed above, the non-terminal socket 305, the clamp 350, the bushing 405, the nut 450, and the receptacle 40 may be made of (for example) thermoplastic injection molded components. The shield members 500, 600, 700 of device 10 may be (for example) one or more polarized or tinted lenses that allow the user to reduce or otherwise manipulate light without blocking all light or blocking the view of a user. Threaded components may be 0.25-inch/20 thread per inch male and female threads. The fixing assemblies 20, 30 and shielding assemblies 50, 60, 70 may be black, clear, or made of customizable colors/shapes/transparencies as appropriate for various locations and depending on the light sources to be experienced by the device 10.

Initially, it must be kept in mind that the device 10 shown in the accompanying drawings and discussed above are merely exemplary, and may assume a wide variety of configurations different from those noted, and may use components different from those noted.

It should also be understood that various terms referring to orientation and position used in this document—for example, "inner" (as in "base inner face"), "forward" (as in "shield member forward side"), and "upwardly" (as in "extend from the clip base 640 in a generally upwardly direction")—are relative terms rather than absolute ones. Thus, such terms should be regarded as words of convenience, rather than limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although the fixing assemblies shown include a suction cup 110 for securing the device 10 to flat surfaces, the fixing assembly may additionally or alternatively include another mechanism for "fixing" or securing the device 10 as the flexible arm 80 and/or shield members 500, 600, 700 are being manipulated. For example, a fixing assembly may include a dashboard mount that employs friction or that otherwise weighs down the device 10 so that it tends to remain in place (such as a dashboard mount weighed down by a sandbag or a "beanbag"). Additionally, the standard suction cup mount 100 may be replaced by a clip device that can be attached to (for example) a mirror, headliner, dash assembly, air vent, other vehicle device (such as a GPS/navigation system, radar detection device, etc.), etc. One of these vehicle devices (or other vehicle accessories) may be a self-contained glare reducing unit (or otherwise provide storage for the device 10) that is incorporated into existing vehicle systems or parts thereof.

Second, although the receptacle 40 connects to the flexible arm 80 via a fixing assembly 20, 30, the receptacle 40 may be configured to be directly securable to the flexible arm 80. For example, the receptacle 40 may include a socket, clip, or other interface for securing the receptacle 40 to the flexible arm 80. Moreover, the receptacle 40 may be configured to be securable to structures other than the visor of a vehicle. For example, the receptacle 40 may be configured to secure the device 10 to air vents, consoles, or other parts of a vehicle. Further, the receptacle 40 could be configured to secure the device 10 to a window pane, a computer monitor/display, or any other structure where there might be undesirable light.

Third, although the fixing assembly interface 140 is shown in the figures as a ball socket, the fixing assembly interface 140 may be any structure that allows the fixing assembly to interface with other components of the device 10. For example, the fixing assembly interface 140 may be an externally-threaded socket onto which an internally-threaded socket (such as socket 150) may be fastened. Such an externally-threaded socket may be a molded-in component of a custom suction cup mount that extends from the suction cup to the externally-threaded socket.

Fourth, the spring clip 630 may be secured to the shield member in any manner desired in place of the shield member boss 610, shield member cradle 620, and fastener 680. For example, the spring clip 630 may include a clip flange extending from the clip base 640 away from the clip first and second wings 650A, 650B. That is, if the clip first and second wings 650A, 650B extend from the clip base 640 in a generally upwardly direction, the clip flange could extend from the clip base 640 in a generally downwardly direction. The clip flange may include a clip flange aperture. The shield member may include two sleeves that receive opposing sides of the clip flange, and a knob situated approximately midway between the sleeves. Once the clip flange has been slid into the sleeves, the clip flange can be pressed against the shield member to "snap" the knob into the clip flange aperture, securing the spring clip 630 to the shield member of the clipped shielding assembly 60. Additionally or alternatively, the clip may be heat-staked onto the shield member 600.

Fifth, the terminal fixing assembly 20 and the terminal shielding assembly 70 need not be secured to the flexible arm 80 via a pin 200. They may instead be secured, for example, via threaded portions formed at the ends of the flexible arm 80, or via any (male/female) connector combination.

Sixth, the fixing 20, 30 and shielding 50, 60, 70 assemblies can incorporate/house or otherwise display messages, advertisements, images, etc. (such as those of sports teams, "causes" (such as "Race for the Cure"), NASCAR, universities and colleges, businesses, etc.).

Seventh, the flexible arm 80 may be flexible only, telescoping only, or a combination of flexible and telescoping, and can be coated or non-coated to change its gripability, visibility/ appearance, etc. Like the fixing assemblies 20, 30, the flexible arm 80 additionally may incorporate/house or otherwise display messages, advertisements, images, etc. Moreover, the flexible arm 80 may be black, clear, colored/patterned, or otherwise able to receive customizable sleeves as desired based on the amount and types of light experienced by the device 10.

Eighth, the length of the flexible arm 80/size of the overall device 10 may be varied to suit various uses. For example, a larger/longer device 10 may be more appropriate/desired for use in a commercial truck whereas a smaller/shorter device 10 may be appropriate/desired for compact cars.

Ninth, the light-reducing/glare-reducing device 10 may include two or more flexible arms 80 secured to each other or to a fixing assembly, clip, or other securing mechanism for multiple, simultaneous users.

Tenth, one or more lenses (as shield members 500, 600, 700 or as separate components) may be provided with various configurations and dimensions, and with varying degrees of tinting/polarization. One or more lenses may also be secured to (for example) a shield member 500, 600, 700, the flexible arm 80, or a fixing assembly 20, 30 using a suitable attachment mechanism (such as a male/female connector system, adhesives, etc.). Like the fixing assemblies 20, 30 and the flexible arm 80, the lenses may incorporate/house or otherwise display messages, advertisements, images, etc. Lens coloration/transparency may be varied to suit different sources of light or tastes. The lenses can also be interchangeable via a quick release/attachment assembly, allowing users to swap out damaged/scratched lenses or otherwise change lenses based on their size/configuration/appearance/etc.

Eleventh, one or more lenses of different shapes, sizes, thicknesses, tints, polarizations, transparencies etc., can be positioned at various locations on the device 10. For example, a first lens/shield member that is opaque or reflective (made of, for example, a plastic that blocks substantially all light from passing therethrough) may be secured to the flexible arm 80 (at, for example, one end thereof) or a fixing assembly to reflect, absorb, or otherwise block light from a particular source. A second lens/shield member that is partially transparent (made of, for example, tinted or polarized plastic or glass) may be secured to the flexible arm 80 (at, for example, an opposing end) or a fixing assembly to reduce the level of light but nonetheless allow the user to see objects on its other side. With such a device 10, the first lens can be aimed (for example) upwardly at light shining directly from a source of light while the second lens can be aimed (for example) forwardly at light that is reflecting off of the road without blocking the driver's view of the road.

Twelfth, the device 10 may incorporate one or two terminal fixing assemblies 20, one or more non-terminal fixing assemblies 30, or one terminal fixing assembly 20 with one or more non-terminal fixing assemblies 30. Similarly, the device 10 may incorporate one or two terminal shielding assemblies 70 in combination with one or more non-terminal shielding assemblies 50, 60. Using more than one fixing assembly may allow the user to better secure the device 10 to various surfaces in different configurations as desired, but multiple fixing assemblies are not required. It is noted that the fixing assemblies themselves may provide shielding, able to block or otherwise disrupt the path of some undesired light. As suggested above, lenses may be incorporated into any of the fixing assemblies 20, 30/shielding assemblies 50, 60, 70/shield members 500, 600, 700 to allow for better manipulation of light.

Thirteenth, the device 10 may be configured to be adjustable remotely (using, e.g., a battery-operated remote control, a smartphone, a networked device, etc.). One or more motors may be incorporated into (for example) the fixing assemblies 20, 30, shielding assemblies 50, 60, 70, and/or the flexible arm 80 to enable adjustments of the relative positions of the flexible arm 80, shield members 500, 600, 700, lenses, etc. (and thus what light is shielded). This may be particularly desirable when the device 10 is to be positioned out of easy reach of the user. For example, remote adjustment could allow a truck driver to make adjustments to a device 10 secured to the truck's windshield without needing to rise from the driver's seat each time an adjustment is to be made.

The invention is not intended to be limited to the preferred versions of the invention described above, but rather is intended to be limited only by the claims. Thus, the invention encompasses all different versions that fall literally or equivalently within the scope of these claims.

What is claimed is:

1. A device for reducing glare, the device including:
   a. a flexible arm capable of being adjusted to hold various configurations;
   b. a fixing assembly secured to the flexible arm, the fixing assembly having a suction cup for removably securing the flexible arm to a smooth surface; and
   c. a shield assembly secured to the flexible arm,
      i. the shield assembly having a shield member with a shield forward side and an opposing shield rear side,
      ii. the shield member reducing or redirecting light reaching objects on the shield rear side.

2. The device of claim 1 wherein:
   a. the fixing assembly includes a suction cup mount extending from the suction cup to a fixing assembly interface; and
   b. the fixing assembly further includes a socket secured to the fixing assembly interface and to the flexible arm.

3. The device of claim 2 wherein:
   a. the socket includes a socket boss protruding from a socket base, the socket boss having a socket boss aperture formed therein;

b. the socket base is removably securable to the fixing assembly via the fixing assembly interface; and c. the socket boss is removably securable to the flexible arm by receiving a portion of the flexible arm in the socket boss aperture.

4. The device of claim 3 wherein:

a. the fixing assembly interface is a ball socket;

b. the socket base is securable to the ball socket by inserting at least a portion of the ball socket into the socket base;

c. the flexible arm extends from an arm first end to an opposing arm second end;

d. the flexible arm includes a pin having a pin threaded portion, the pin being situated at the arm first end;

e. the socket boss aperture includes a threaded insert; and f. the flexible arm is securable to the socket by engaging the arm threaded portion with the threaded insert in the socket boss aperture.

5. The device of claim 1 wherein:

a. the fixing assembly includes:

i. a suction cup mount that extends from the suction cup to a fixing assembly interface;

ii. an externally-threaded socket securable to the suction cup mount via the fixing assembly interface;

iii. a clamp having a clamp head portion with a valley formed therein, the valley shaped to complementarily receive a portion of the flexible arm;

iv. a bushing having a bushing head portion, the bushing head portion:

1) having bushing apertures at opposing sides thereof, the bushing apertures aligned so as to allow the flexible arm to pass therethrough; and 2) being sized to receive at least a portion of the clamp head portion;

v. an internally-threaded nut sized to fit over the externally-threaded socket, the nut having a nut aperture extending therethrough, the nut aperture sized to receive at least a portion of the bushing head portion;

b. when the fixing assembly is assembled, the flexible arm extends through the valley and the bushing apertures and the internally-threaded nut engages the externally-threaded socket.

6. The device of claim 1 wherein:

a. the shield assembly includes a clip having:

i. a clip base;

ii. a clip first wing and a clip second wing, the clip first and second wings:

1) extending from the clip base; and 2) having clip first and second wing apertures, the clip first and second wing apertures being sized to receive the flexible arm therethrough; and b. the clip first and second wings are biased such that:

i. the clip first and second wing apertures can be substantially aligned to allow the flexile arm to pass therethrough by pressing the clip first and second wings are closer together; and ii. the clip first and second wings press against the flexible arm such that the clip resists sliding along the flexible arm when:

1) the flexible arm extends through the clip first and second wing apertures; and 2) the clip first and second wings are not being pressed closer together.

7. The device of claim 1 wherein:

a. the flexible arm extends from an arm first end to an opposing arm second end;

b. the shield assembly includes shield member having a shield boss extending therefrom, the shield boss having a shield boss aperture formed therein; and c. the flexible arm is securable to the shield assembly by inserting the flexible arm second end at least partly into the shield boss aperture.

8. The device of claim 1 wherein:

a. the shield assembly includes:

i. a shield member having a shield base extending therefrom;

ii. a clamp having a clamp head portion with a valley formed therein, the valley shaped to complementarily receive a portion of the flexible arm;

iii. a bushing having a bushing head portion, the bushing head portion:

1) having bushing apertures at opposing sides thereof, the bushing apertures aligned so as to allow the flexible arm to pass therethrough; and 2) being sized to receive at least a portion of the clamp head portion;

iv. a nut sized to fit over the shield base, the nut having a nut aperture extending therethrough, the nut aperture sized to receive at least a portion of the bushing head portion;

b. when the shield assembly is assembled with the nut engaging the shield base, the flexible arm:

i. extends through the valley and the bushing apertures; and ii. is secured to the shield assembly.

9. The device of claim 8 wherein:

a. the shield base is cylindrical and externally threaded;

b. the nut is internally threaded; and c. the nut fastens to the shield base to secure the bushing and the clamp to the shield member.

10. The device of claim 1 further including a receptacle, a. the receptacle having:

i. a receptacle base;

ii. a receptacle arm retractably biased towards the receptacle base; and iii. a receptacle slot sized to at least partly receive the suction cup therein;

b. wherein the fixing assembly is securable to a sun visor when:

i. the suction cup is received within the receptacle slot; and ii. the sun visor is received between the receptacle base and the receptacle arm.

11. The device of claim 10 wherein:

a. the receptacle base includes a base inner face and an opposing base outer face;

b. the receptacle arm extends from the base outer face; and c. the base inner face is:

i. at least substantially flat; and ii. sized such that the suction cup is securable thereto.

12. The device of claim 10 wherein:

a. the receptacle base includes a spring finger, the spring finger having:

i. a finger ramp extending therefrom; and ii. a finger tab; and b. when the suction cup is received within the receptacle slot:

i. the ramp impedes the suction cup exiting the receptacle slot; and ii. the ramp may be moved such that it does not impede the suction cup exiting the receptacle slot by applying pressure to the finger tab.

13. The device of claim 1 wherein:
a. the flexible arm extends from an arm first end to an arm second end;
b. the fixing assembly is positioned between the arm first end and the arm second end;
c. the shield assembly is a first shield assembly having a first shield member; and
d. the device further includes a second shield assembly having a second shield member, the second shield member being secured to the flexible arm:
   i. between the arm first end and the arm second end, with the arm first end and the arm second end on opposing sides of the second shield member; and
   ii. such that the second shield member can be repositioned by changing the shape of the flexible arm.

14. The device of claim 1 wherein:
a. the flexible arm extends from an arm first end to an arm second end;
b. the fixing assembly is a terminal shield assembly positioned at the arm first end;
c. the shield assembly is a terminal shield assembly positioned at the arm second end.

15. A device for reducing glare, the device including:
a. a fixing assembly having:
   i. a suction cup for removably securing the flexible arm to an at least substantially smooth surface;
   ii. a fixing assembly interface; and
   iii. a socket that is securable to the fixing assembly interface;
b. an elongated flexible arm capable of being adjusted to hold various configurations, the flexible arm secured to the fixing assembly via the socket; and
c. a shield assembly having a shield member with a shield forward side and an opposing shield rear side, the shield member:
   i. reducing light that reaches the shield rear side from the rear forward side; and
   ii. being secured to the flexible arm such that the shield member can be repositioned by changing the shape of the flexible arm.

16. The device of claim 15 wherein:
a. the fixing assembly interface is a ball socket; and
b. the socket includes a socket base forming a socket female portion able to securely receive the ball socket therein.

17. The device of claim 15 wherein:
a. the flexible arm extends from an arm first end to an arm second end; and
b. the shield assembly is positioned along the flexible arm, the arm first end and the arm second end being situated on opposing sides of the shield assembly.

18. The device of claim 15 wherein:
a. the flexible arm extends from an arm first end to an arm second end;
b. the fixing assembly is positioned between the arm first end and the arm second end;
c. the shield assembly is a first shield assembly having a first shield member; and
d. the device further includes a second shield assembly having a second shield member, the second shield member being secured to the flexible arm such that the second shield member can be repositioned by changing the shape of the flexible arm.

19. A device for reducing glare, the device including:
a. a fixing assembly having:
   i. a suction cup mount with a suction cup and a ball socket, the suction cup being removably securable to an at least substantially smooth surface; and
   ii. a socket having a socket base with a socket female portion, the socket female portion able to securely receive the ball socket therein;
b. an elongated flexible arm that is adjustable to hold various configurations, the flexible arm secured to the fixing assembly via the socket; and
c. a shield assembly secured to the fixing assembly, the shield assembly:
   i. having a shield member for shielding light; and
   ii. being secured to the flexible arm such that the shield member can be repositioned by adjusting the configuration of the flexible arm.

20. The device of claim 19 wherein:
a. the flexible arm extends from an arm first end to an arm second end; and
b. the shield assembly is configured such that the shield member can be repositioned along the length of the flexible arm without separating the shield assembly from the flexible arm.

\* \* \* \* \*